Sept. 19, 1933.  G. F. MULLIN  1,927,803
EXPANSIBLE CORE
Filed March 19, 1931
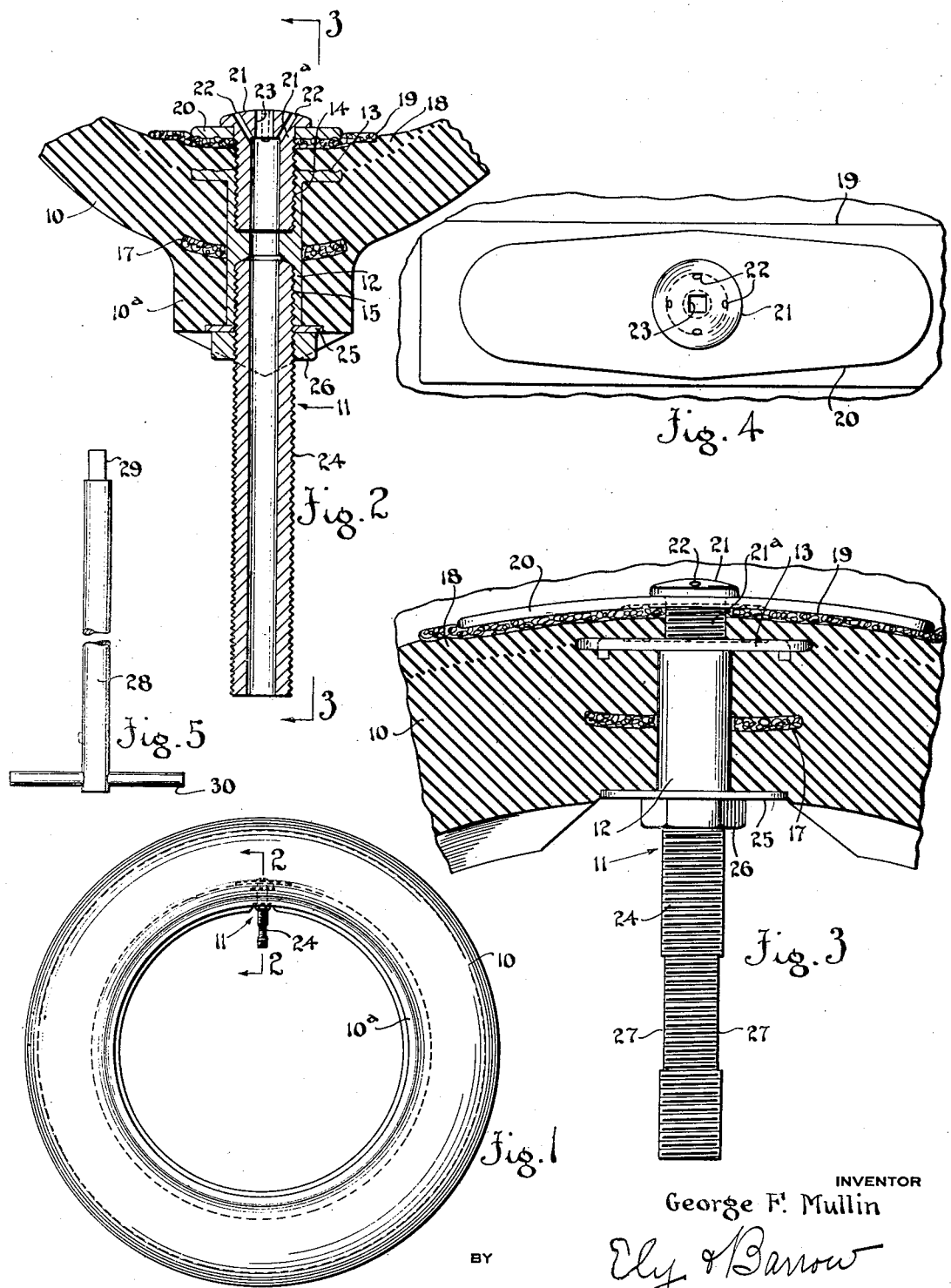
INVENTOR
George F. Mullin
BY Ely & Barrow
ATTORNEYS Patented Sept. 19, 1933

1,927,803

UNITED STATES PATENT OFFICE 1,927,803

EXPANSIBLE CORE

George F. Mullin, Akron, Ohio, assignor to The Firestone Tire & Rubber Company, Akron, Ohio, a corporation of Ohio Application March 19, 1931. Serial No. 523,762

6 Claims. (Cl. 18—45)

This invention relates to expansible cores and to methods of making the same, and more especially it relates to hollow annular cores of elastic material, such as the rubber water bags used in the vulcanization of tire casings, and to procedure for manufacturing the same.

The chief objects of the invention are to prevent leakage of fluid from the core; to improve the union of the rubber core structure with the tubular stem or connection therein; and to provide an improved method of mounting the tubular stem in the rubber core structure. Other objects will be manifest as the specification proceeds.

Of the accompanying drawing:

Figure 1 is a side elevation of an expansible core embodying and made according to the invention, in its preferred form;

Figure 2 is a section on the line 2—2 of Figure 1 on a larger scale;

Figure 3 is a section on the line 3—3 of Figure 2;

Figure 4 is a plan view of the structure shown in Figure 3; and

Figure 5 is an elevation of a tool used in the manufacture of the improved expansible core.

Referring to the drawing, 10 is a hollow, annular, expansible core of rubber such as commonly is used inside of a tire casing during the vulcanization thereof, for distending the tire casing into conformity with an encompassing mold, the inner peripheral portion 10a of the core, which lies between the bead portions of the tire, being considerably thicker than the rest of the core. Extending radially through the thickened portion 10a of the core, and molded therein, is a tubular stem or connection, generally designated 11, through which hot fluid under pressure is admitted to and withdrawn from the interior of the core 10.

The connection 11 comprises a tubular body structure 12 that is formed at its inner end with an integral external flange 13, and is internally formed with female screw threads 14, 15 extending from its inner and outer ends respectively.

The structure 12 is molded into the core 10, there being a local reinforcement consisting of a layer of fabric or fibrous rubber composition 17 in the portion 10a of the core, through which the structure 12 extends. The flange 13 is overlaid with a layer of rubber composition 18, and a relatively large pad 19 of relatively stiff fibrous rubber composition covering the latter. An elongate washer 20 is mounted upon the inner end portion of the stem structure and forced against the pad 19 by a cap 21 that is formed with a tubular axial extension 21a that is exteriorly threaded to fit the threads 14 in the inner end of the structure 12. The cap 21 is formed with apertures 22, 22 of any suitable size and shape, and with a square axial aperture 23 for receiving a suitable tool by which the cap may be turned to tighten it against the washer 20. The apertures 22, 23 constitute passages for fluid that flows into and out of the expansible core 10.

The outer end of the member 12 is disposed within the portion 10a of the core slightly below the surface at the inner periphery of the latter, and an externally threaded tubular stem 24 is threaded into said outer end portion of the member 12, said stem extending through the intervening rubber between the end of the member 12 and the inner periphery of the core. A washer 25 is mounted upon the stem 24 and pressed against the core-wall by a nut 26 threaded onto said stem. The stem 24 is formed with diametrically opposed flat faces 27, 27 for receiving a wrench or other suitable tool (not shown) for turning the stem to thread it into or out of the member 12.

In Figure 5 is shown a suitable tool for turning the cap 21, said tool comprising an elongate cylindrical body portion 28 adapted to extend through the tubular stem 24, a square end portion 29 adapted to fit within the square aperture 23 of the cap 22, and a pin 30 extending transversely through the opposite end portion of the tool for grasping the same.

In the manufacture of the improved expansible cores, the respective parts of the core 10 and connection 11 are assembled as shown, the rubber parts of course being in unvulcanized condition, and the cap 21 and nut 26 are set up moderately tight, but not tight enough to distort or displace the rubber. In this condition the core is mounted in a mold and vulcanized by heat and internal pressure in the usual manner. During the vulcanizing operation the rubber should vulcanize to the connection 11, but usually this is imperfectly effected so that there are local regions of slight separation which heretofore have permitted leakage of fluid from the core during use.

After the core is vulcanized, the cap 21 is set up tightly by the use of the tool 28, and the nut 26 also is set up tightly, with the result that the vulcanized rubber surrounding the connection 11 is put under pressure, and displacement of the rubber due to said pressure causes it firmly to press against the exterior of the connection so that leakage about the connection is avoided.

The presence of the plies 17 and 19 of fibrous composition in the core structure assists in preventing material flow of the rubber away from the connection 11 during the vulcanization of the core, the fibrous composition being less plastic than ordinary rubber when heated.

The invention provides an improved expansible core which will not leak around the stem or connection, and the inwardly projecting stem 24 thereof may be easily and quickly replaced when it becomes worn or bent.

Modification may be resorted to within the scope of the appended claims which are not limited wholly to the specific construction shown or exact procedure described.

What is claimed is:

1. An expansible core comprising a hollow molded rubber structure, a tubular stem extending partially through the wall thereof, and an apertured cap threaded into the end of the stem within the core, said cap being formed with an internal wrench socket whereby said cap may be further threaded into the end of the stem after the core has been molded for compressing material of the core between the cap and the end of the stem.

2. An expansible core comprising a hollow rubber structure, a tubular stem molded into the wall thereof a washer mounted upon the inner end portion of said stem, and a tubular bolt threaded into the same end of the stem for urging the washer against the core-wall, the bore of said tubular bolt being formed with a wrench socket whereby the bolt may be threaded by a tool introduced through the tubular stem.

3. An expansible core comprising a hollow rubber structure, and a tubular connection therefor comprising a tubular body structure molded into the core wall with its outer end short of the outer face thereof, a tubular stem threaded into the outer end of said body structure, a washer on said stem, and a nut threaded onto said stem for urging the washer against the core-wall and into seating relation with the outer end of the tubular body structure.

4. A combination as defined in claim 3 including a washer adjacent the inner end of the body structure of the connection, and a member threaded to said body structure urging the washer against the inner surface of the core-wall.

5. A combination as defined in claim 3 including a flange on the inner end of the body structure of the connection, and a tubular flanged bolt threaded into said body structure, the bore of said bolt being formed with a wrench socket for the application of a wrench to turn said bolt for urging the flanged bolt against the inner surface of the core-wall and for compressing the material of the core between the flanged bolt and the flange on the body structure.

6. A combination as defined in claim 2 in which a fibrous composition washer is interposed between the surface of the core and the washer which is urged against the core wall by the tubular bolt.

GEORGE F. MULLIN.